United States Patent
Li et al.

(10) Patent No.: US 9,473,430 B2
(45) Date of Patent: Oct. 18, 2016

(54) METHOD AND SYSTEM FOR GROUP NUMBER-BASED MICROBLOG AGGREGATION

(71) Applicant: TENCENT TECHNOLOGY (SHENZHEN) COMPANY LIMITED, Shenzhen, Guangdong (CN)

(72) Inventors: Jian Li, Shenzhen (CN); Lei Wei, Shenzhen (CN); Wu Long, Shenzhen (CN); Wencai Huang, Shenzhen (CN); Jingjing Li, Shenzhen (CN); Jun Lu, Shenzhen (CN)

(73) Assignee: TENCENT TECHNOLOGY (SHENZEN) COMPANY LIMITED, Shenzhen (CN)

( * ) Notice: Subject to any disclaimer, the term of this patent is extended or adjusted under 35 U.S.C. 154(b) by 395 days.

(21) Appl. No.: 14/100,555

(22) Filed: Dec. 9, 2013

(65) Prior Publication Data

US 2014/0101272 A1    Apr. 10, 2014

Related U.S. Application Data

(63) Continuation of application No. PCT/CN2012/080166, filed on Aug. 15, 2012.

(30) Foreign Application Priority Data

Aug. 15, 2011   (CN) .......................... 2011 1 0233373

(51) Int. Cl.
   *G06F 15/16*   (2006.01)
   *H04L 12/58*   (2006.01)

(52) U.S. Cl.
   CPC .............. *H04L 51/04* (2013.01); *H04L 51/32* (2013.01)

(58) Field of Classification Search
   CPC ..... H04L 51/00–51/38; H04L 12/581–12/589
   See application file for complete search history.

(56) References Cited

U.S. PATENT DOCUMENTS 8,996,625 B1 *   3/2015   Singleton ................ H04L 29/06
                                                                707/771
2011/0055723 A1   3/2011   Lightstone
(Continued)

FOREIGN PATENT DOCUMENTS

| CN | 101917456 A | 12/2010 |
| CN | 102088466 A | 6/2011 |
| CN | 102147903 A | 8/2011 |

OTHER PUBLICATIONS

International Search Report in international application No. PCT/CN2012/080166, mailed on Nov. 22, 2012.
(Continued)

*Primary Examiner* — Brendan Higa
(74) *Attorney, Agent, or Firm* — Oppedahl Patent Law Firm LLC

(57) ABSTRACT

The present disclosure provides a method for group number-based microblog aggregation and a system for group number-based microblog aggregation, which are used for realizing microblog aggregation display for group numbers. In the present disclosure, the binding relationship between a group number and microblog accounts is established, a large number of microblog accounts are bound by one group number, so that a client can initiate a microblog aggregation request based on the group number, and microblog messages issued by a large number of bound microblog accounts can be obtained by only transmitting one group number in an inquiry interface. According to the present disclosure, group users can learn the microblog dynamic states of other group users in real time conveniently, group functions are expanded, and time and network traffic of the users are saved.

8 Claims, 1 Drawing Sheet

(56) References Cited

U.S. PATENT DOCUMENTS

2011/0087604 A1    4/2011  Chung
2012/0094721 A1*   4/2012  Brondmo ............. H04L 12/588
                                                           455/566
2015/0278367 A1*  10/2015  Chang ............... G06F 17/30867
                                                           707/723

OTHER PUBLICATIONS

English Translation of the Written Opinion of the International Search Authority in international application No. PCT/CN2012/080166, mailed on Nov. 22, 2012.

* cited by examiner

METHOD AND SYSTEM FOR GROUP NUMBER-BASED MICROBLOG AGGREGATION

CROSS REFERENCE TO RELATED APPLICATIONS

This is a continuation application of International Patent Application No.: PCT/CN2012/080166, filed on Aug. 15, 2012, which claims priority to Chinese Patent Application No.: 201110233373.X filed on Aug. 15, 2011, the disclosure of which is incorporated by reference herein in its entirety.

TECHNICAL FIELD

The present disclosure relates to Internet technology, in particular to method and system for group number-based microblog aggregation.

BACKGROUND

MicroBlog is a user relationship-based information sharing, disseminating and acquiring platform. Users can organize personal communities through WEB, a Wireless Application Protocol (WAP) and various types of clients, update information through around 140 words, and realize instant sharing.

Instant messaging tools, such as QQ, MSN and Skype, are tools for network users to perform real-time communication through networks, and are necessary tools of a larger number of network users. Interaction among people is enhanced by those instant messaging tools. Groups in the instant messaging tools provide good discussion and communication places for people with common interests and hobbies or with certain common characteristics.

In the prior art, when a group user hopes to learn the microblog issued by other group users in time, the user must know the microblog access addresses of the other users or use the microblog link in user data, and manually open the microblog homepages of the group users who have subscribed the microblog one by one. The process is very cumbersome, time-wasting and not user-friendly.

SUMMARY

The present disclosure provides method and system for group number-based microblog aggregation, so as to realize the microblog aggregation display for the group number.

Therefore, the technical scheme of the present disclosure is implemented in the following way:

the method for group number-based microblog aggregation comprises:

establishing a binding relationship between a group number and microblog accounts; and acquiring microblog messages issued by the bound microblog accounts based on the binding relationship between the group number and the microblog accounts after receiving a request for group number-based microblog aggregation initiated by a client, and feeding the acquired microblog messages back to the client.

Preferably, the microblog accounts bound to the group number comprise the microblog accounts of group member users and/or the microblog accounts of non-group member users.

Preferably, when the microblog accounts are the microblog accounts of the group member users, the step of establishing a binding relationship between a group number and microblog accounts may include:

acquiring the accounts of the group member users according to the group number, inquire the group member users who have subscribed the microblog, acquire the microblog accounts of the group member users who have subscribed microblog, and establish the binding relationship between the microblog accounts of the group member users who have subscribed microblog and the group number.

Preferably, when the microblog accounts are the microblog accounts of the non-group member users, the step of establishing the binding relationship between the group number and the microblog accounts may include:

establishing the binding relationship between the microblog accounts of the non-group member users and the group number according to settings or the microblog accounts of the non-group member users acquired by inquiring a microblog system.

Preferably, the method may further include:

providing a management interface for the binding relationship between the group number and the microblog accounts, and perform management and maintenance operation on the bound microblog accounts through the management interface.

The present disclosure also provides a system for group number-based microblog aggregation, comprising:

a server, configured to store a binding relationship between a group number and microblog accounts;

an intermediate layer, configured to acquire the microblog accounts bound to the specified group number from a server in response to a microblog aggregation request initiated by the client for the specified group number, aggregate microblog messages issued by the microblog accounts bound to the specified group number, and feed the aggregated microblog messages back to the client; and the client, configured to initiate the microblog aggregation request for the specified group number and display the fed microblog messages.

Preferably, the server may further be configured to provide a management interface for the binding relationship between the group number and the microblog accounts; and the client is further configured to manage and maintain the binding relationship between the group number and the microblog accounts through the management interface.

Preferably, the microblog accounts bound to the group number may include the microblog accounts of group member users and/or the microblog accounts of non-group member users.

Preferably, when the microblog accounts are the microblog accounts of the group member users, the client acquires the accounts of the group member users according to the group number, inquires the group member users who have subscribed the microblog, acquires the microblog accounts of the group member users who have subscribed the microblog, and establishes the binding relationship between the microblog accounts of the group member users who have subscribed the microblog and the group number.

Preferably, when the microblog accounts are the microblog accounts of the non-group member users, the client establishes the binding relationship between the microblog accounts of the non-group member users and the group number according to settings or the microblog accounts of the non-group member users acquired by inquiring a microblog system.

The technical effects of the disclosure are that: the binding relationship between the group number and the microblog accounts is established, a large number of microblog accounts can be bound by one group number, so that the client can initiate the microblog aggregation request based on the group number, and the microblog messages issued by a large number of bound microblog accounts can be obtained by only transmitting one group number in an inquiry interface; and therefore, the group users can learn the microblog dynamic states of other group users in real time conveniently, group functions are expanded, and time and network traffic of the users are saved.

DETAILED DESCRIPTION

In order to make the purpose, the technical scheme and the advantages of the disclosure more clear, the present disclosure is described below with reference to embodiments and accompanying drawings in detail.

Figure 1:
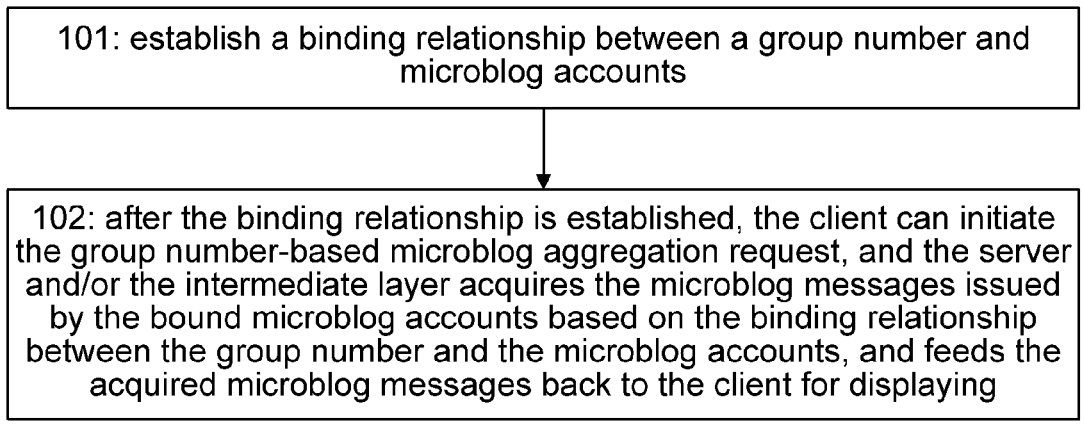
FIG. 1 shows a flowchart of the method for group number-based microblog aggregation provided by an embodiment of the present disclosure.

FIG. 1 shows a flowchart of the method for group number-based microblog aggregation provided by an embodiment of the present disclosure. The method comprises:

Step 101, establish a binding relationship between a group number and microblog accounts;

the group of the embodiment of the disclosure refers to the set of the users with common interests and hobbies or with certain common characteristics. The method provided by the embodiment of the disclosure can be applied to any application with group concept, for example, client/server structure-based instant messaging tools, browser-based group homepages, group communities or the like.

The microblog accounts of the embodiment of the disclosure are the user accounts in the microblog system. The microblog accounts can be the same as the accounts of the group member users, namely the sharing of the same user account in a plurality of applications can be realized.

Further, based on different application scenarios, the microblog accounts bound to the group number comprise the microblog accounts of group member users and/or the microblog accounts of non-group member users.

For example, when the group type is a relationship-based group, such as a schoolmate group, a fellow-townsman group and a friend group, the microblog accounts bound to the group number can only comprise the microblog accounts of part or all group member users who have subscribed the microblog. For the interests and hobbies-based group, the microblog accounts bound to the group number can only comprise the microblog account of a certain star or a certain specialist; and the star or the specialist can be a group member user or not a group member user.

Further, the disclosure can provide a flexible management interface, which allows a group manager to manage and maintain the binding relationship between the group number and the microblog accounts, and inquire, add and delete the bound microblog accounts. The microblog accounts to be added or deleted can be the microblog accounts of the group member users or the microblog accounts of the non-group member users; and the type of the group is not limited.

Further, when the microblog accounts bound to the group number are the microblog accounts of the group member users, the method for establishing the binding relationship between the group number and the microblog accounts specifically comprises: first, acquire the accounts of the group member users according to the group number; then, inquire whether each group member user has subscribed the microblog from the server of a group system or the server of the microblog system and acquire the microblog accounts of the group member users who have subscribed the microblog; and then, establish the binding relationship between the microblog accounts of the group member users who have subscribed the microblog and the group number.

Further, when the microblog accounts are the microblog accounts of the non-group member users, the method for establishing the binding relationship between the group number and the microblog accounts specifically comprises: the group manager sets the microblog to be bound, or the group manager inquires the microblog accounts of the non-group member users to be bound from the microblog system, and establishes the binding relationship between the microblog accounts of the non-group member users and the group number if the set microblog accounts exist or the microblog accounts to be bound have been inquired in the microblog system. Establishing the binding relationship substantially is to subscribe the microblog of the microblog accounts which have the binding relationship with the group number to a microblog display interface of the group.

Step 102, after the binding relationship is established, the client can initiate the group number-based microblog aggregation request; and the server and/or the intermediate layer acquires the microblog messages issued by the bound microblog accounts based on the binding relationship between the group number and the microblog accounts, and feeds the acquired microblog messages back to the client for displaying.

Figure 2:
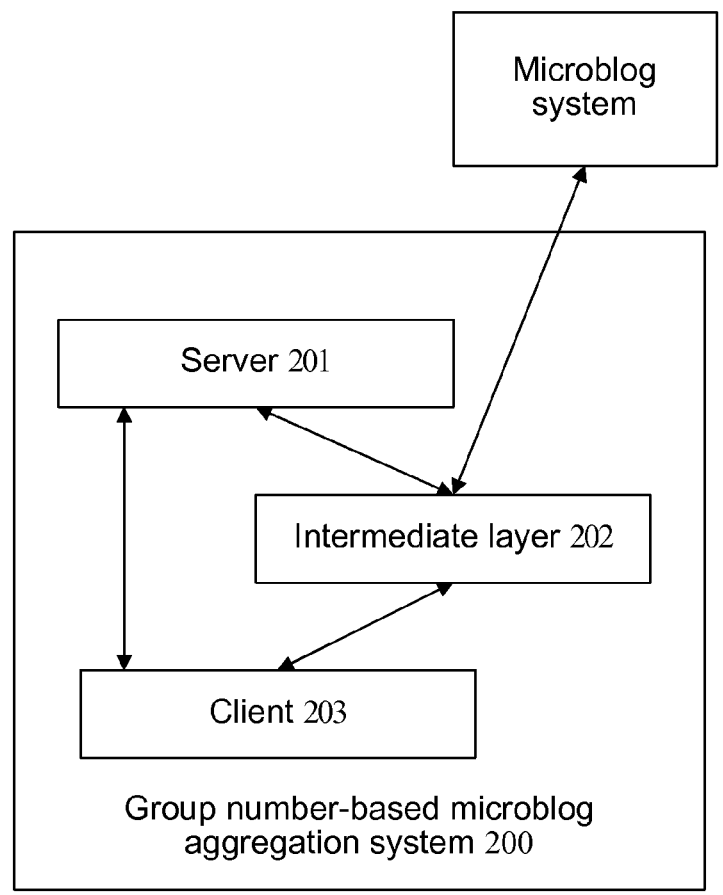
FIG. 2 shows a structural diagram of the system for group number-based microblog aggregation provided by an embodiment of the present disclosure.

FIG. 2 shows the structural diagram of the system for group number-based microblog aggregation provided by an embodiment of the present disclosure. The system 200 comprises:

the server 201, configured to store a binding relationship between a group number and microblog accounts;

further, the server 201 is also configured to provide a management interface for the binding relationship between the group number and the microblog accounts; and through the interface, the group manager can perform the management and maintenance operation, such as inquiring, adding and deleting, on the binding relationship between the group number and the microblog accounts.

further, on the basis of different application scenarios, the microblog accounts bound to the group number comprise the microblog accounts of group member users and/or the microblog accounts of non-group member users;

the intermediate layer 202, configured to acquire the microblog accounts bound to the specified group number from a server 201 in response to a microblog aggregation request by the client for the specified group number initiated, aggregate the microblog messages issued by the microblog accounts bound to the specified group number, and feed the aggregated microblog messages back to the client;

in order to facilitate comprehension, the intermediate layer 202 can be regarded as an interface layer which takes charge of the processing of the request and response of the microblog aggregation based on the binding relationship between the group number and the microblog accounts, In addition, the intermediate layer 202 also needs to take charge of processing the tasks such as terminal cross-domain access and the character encoding conversion between a terminal and the microblog system.

the client 203, configured to initiate the microblog aggregation request for the specified group number to the intermediate layer 202 and display the aggregated microblog messages fed back by the intermediate layer; and further, the client 203 also takes charge of providing a management and maintenance interface for the microblog accounts, and manages and maintains the binding relationship between the group number and the microblog accounts through the management interface.

Those ordinarily skilled in the art can know that all or part flows in the method of the embodiment can be accomplished by instructing relevant hardware through a computer program. The program can be stored in a computer-readable storage medium. When the program is executed, the flows of the embodiment of each method can be included. The storage medium can be a disk, a compact disk, a Read-Only Memory (ROM), a Random Access Memory (RAM) or the like.

The above is only the preferred embodiment of the present disclosure and not intended to limit the scope of the present disclosure.

The invention claimed is:

1. A method for group number-based microblog aggregation, comprising:

establishing a binding relationship between a group number and microblog accounts, wherein the microblog accounts bound to the group number comprise microblog accounts of non-group member users; and acquiring microblog messages issued by the bound microblog accounts based on the binding relationship between the group number and the microblog accounts after receiving a request for group number-based microblog aggregation initiated by a client, and feeding the acquired microblog messages back to the client;

wherein when the microblog accounts are the microblog accounts of the non-group member users, the step of establishing the binding relationship between the group number and the microblog accounts comprises:

establishing the binding relationship between the microblog accounts of the non-group member users and the group number according to settings or the microblog accounts of the non-group member users acquired by inquiring a microblog system.

2. The method according to claim 1, wherein the microblog accounts bound to the group number further comprise microblog accounts of group member users.

3. The method according to claim 2, wherein when the microblog accounts are the microblog accounts of the group member users, the step of establishing a binding relationship between a group number and microblog accounts comprises:

acquiring the accounts of the group member users according to the group number, inquiring the group member users who have subscribed to the microblog, acquiring the microblog accounts of the group member users who have subscribed to the microblog, and establishing the binding relationship between the microblog accounts of the group member users who have subscribed to the microblog and the group number.

4. The method according to claim 2, further comprising: providing a management interface for the binding relationship between the group number and the microblog accounts, and performing management and maintenance operation on the bound microblog accounts through the management interface.

5. A system for group number-based microblog aggregation, comprising:

a server, configured to store a binding relationship between a group number and microblog accounts, wherein the microblog accounts bound to the group number comprise microblog accounts of non-group member users;

an intermediate layer, configured to acquire the microblog accounts bound to the specified group number from the server in response to a microblog aggregation request initiated by the client for the specified group number, aggregate microblog messages issued by the microblog accounts bound to the specified group number, and feed the aggregated microblog messages back to the client; and the client, configured to initiate the microblog aggregation request for the specified group number and display the fed microblog messages;

wherein when the microblog accounts are the microblog accounts of the non-group member users, the client establishes the binding relationship between the microblog accounts of the non-group member users and the group number according to settings or the microblog accounts of the non-group member users acquired by inquiring a microblog system.

6. The system according to claim 5, wherein the server is further configured to provide a management interface for the binding relationship between the group number and the microblog accounts; and the client is further configured to manage and maintain the binding relationship between the group number and the microblog accounts through the management interface.

7. The system according to claim 5, wherein the microblog accounts bound to the group number further comprise the microblog accounts of the group member users.

8. The system according to claim 7, wherein when the microblog accounts are the microblog accounts of the group member users, the client acquires the accounts of the group member users according to the group number, inquires the group member users who have subscribed to the microblog, acquires the microblog accounts of the group member users who have subscribed to the microblog, and establishes the binding relationship between the microblog accounts of the group member users who have subscribed to the microblog and the group number.

* * * * *